No. 620,731. Patented Mar. 7, 1899.
D. BEST.
HARVESTER GRAIN SEPARATOR AND CLEANER ATTACHMENT.
(Application filed Sept. 28, 1897.)
(No Model.)
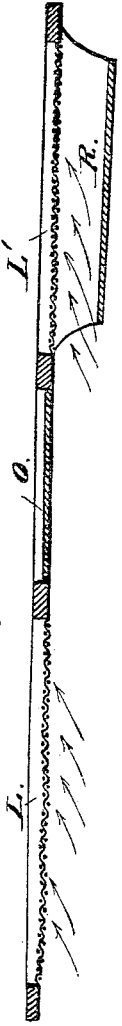
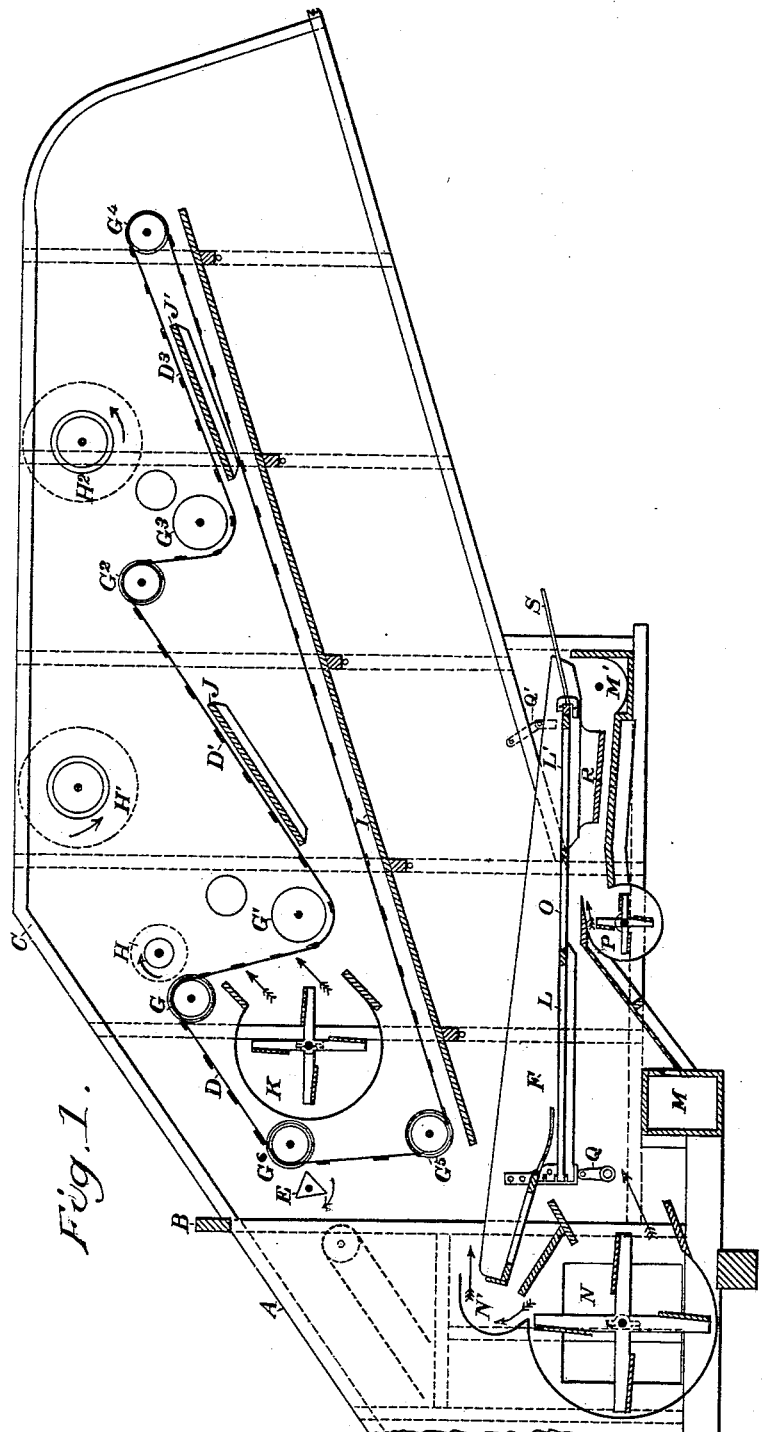
Witnesses,
Inventor,
Daniel Best
By Dewey & Co.
Atty

UNITED STATES PATENT OFFICE.

DANIEL BEST, OF SAN LEANDRO, CALIFORNIA.

HARVESTER GRAIN SEPARATOR AND CLEANER ATTACHMENT.

SPECIFICATION forming part of Letters Patent No. 620,731, dated March 7, 1899.

Application filed September 28, 1897. Serial No. 653,316. (No model.)

*To all whom it may concern:*

Be it known that I, DANIEL BEST, a citizen of the United States, residing at San Leandro, county of Alameda, State of California, have invented an Improvement in Harvester Grain Separator and Cleaner Attachments; and I hereby declare the following to be a full, clear, and exact description of the same.

My invention relates to improvements for grain separating and cleaning machines.

My present improvements are especially adapted to be applied to separators and cleaners which form a part of combined harvesters, such as are adapted to travel over the field and cut and thresh the straw, separate the grain therefrom, and afterward clean the separated grain and place it in sacks.

The object of my invention is especially to provide a separating and cleaning attachment for the above-named class of machines which will enable them to handle heavy straw, which is often found so mixed with weeds as to make it almost impossible to separate and clean the grain with the ordinary form of apparatus.

It consists in details of construction which will be more fully explained by reference to the accompanying drawing, in which—

A is the rear end of the separator-frame cut off in a line with the vertical side timbers B, and C represents a framework and structure which is bolted to the main frame upon the line of the timbers B and extends rearwardly, so as to contain my improvement and supplemental mechanism.

The straw-carrier, which extends up through the portion A of the machine, discharges directly upon a supplemental belt or carrier D. E is a rotary picker or lifting device intermediate between the two, which assists in carrying the straw and delivering it upon the belt D, while the grain falls through into the cleaning-shoe F, this shoe having sieves and screens fixed in it, as hereinafter more fully described. The straw and any weeds or other entangling material which may be contained with it pass diagonally upward upon the belt D, thence over the pulley G, from which the belt drops downward, passing beneath the pulley $G^7$, thence extending upward again in a diagonal plane over the pulley $G^2$, thence again dropping downwardly, passing beneath the pulley $G^3$, thence in a diagonal plane upwardly and over the pulley $G^4$, thence returning in an inclined plane downwardly, passing around a pulley $G^5$, just above the cleaning-shoe, and thence upwardly over the pulley $G^6$, from whence it returns to the pulley G, the belt being an endless one and driven from any desired portion of the machinery, so as to carry the straw upon the upper portion in the course described. Just above and forward of the drum G is a revolving picker H, which acts to lift and carry the straw as it leaves the belt, and at a considerable distance in advance and above this picker is a second one H', revolving in the opposite direction, so that the straw leaving the first inclined surface of the belt D passes between these pickers, which act to separate and loosen it up, so as to allow any grain which may still be entangled with it to fall down through the inclined lower portion of the belt and upon the return-board I, which extends all the way beneath the lower portion of the carrier-belt, so that the return movement of the latter will drag the grain backwardly and eventually deliver it upon the shoe F. The straw which is delivered forcibly downward upon the part D' of the carrier is prevented from passing through and becoming entangled with the belt by a receiving-floor J, which is located beneath the belt at this point and arrests the straw, where a change of direction again takes place and it is carried upward over the roller $G^2$. Thence again passing beneath the pickers $H^2$ it is again thrown downward by the drop of the carrier and strikes upon the portion $D^3$ thereof. A second board J' is located beneath the carrier at this point to again receive and prevent the straw from passing through the carrier and enable it to change its direction, so that it is finally discharged over the outer end of this carrier $G^4$. Each of these changes of direction, assisted by the pickers, acts to separate the straw and allow any grain which may be entangled with it to drop through and be eventually returned to the shoe, as previously described. In order to assist this operation, I have shown a fan-blower located within the sheet-iron fan-case (shown at K) and driven by suitable connections with the other parts of the machine. The discharge of this blower takes place through the drop portion of the carrier between the inclines D and D', so that as the straw and other materials pass between the pickers H and H' and downward upon the receiving-board J this blast of air acts to separate a large portion of the chaff and to loosen up the straw as it falls, so that the heavier grain is more easily disentangled from it. This construction is of considerable assistance in saving grain which might otherwise be lost by reason of the weeds and other material which are often unavoidably cut with the grain and passed through the machine.

The cleaning mechanism is another novel feature of my apparatus. Instead of the ordinary shoe having a single set of screens set in the screen-frames I have shown the shoe extended to approximately double the ordinary length, having a first set of screens L, arranged in the usual manner, and a return-incline delivering the clean grain into the conveyer-box M, from which it is delivered to one side of the machine by a screw conveyer. (Not here shown.)

The fan-blower N is arranged with the usual relation to the screens, discharging a main blast of air from the lower part of the fan-case in a diagonal line, as shown by the arrow. The upper part of the fan-case has an opening made in it and a curved directing-chute N', through which a portion of the air-blast is conveyed and delivered approximately in the line of direction of and above the screens to assist in advancing the chaff toward the rear end of the machine.

The screen-frame and shoe, as before described, are continued rearwardly from the screens, (marked L,) and at the rear or outer end is a second set of screens L', in line with the first ones and fixed in the same shaking-frame. Intermediate between the screens L and L' is a sheet-iron bottom O, and beneath this bottom is a supplemental overshot fan, contained within the case P, as here shown. This second fan discharges a blast of air through the rearmost screen L', thus materially assisting in continuing the movement of the chaff and other material toward the rear end of the shoe, from which it is eventually discharged. The shoe has an end shake. Its inner end is supported from below by crank-arms Q, which oscillate from the inclined position shown in dotted lines up to a vertical position shown in full lines. The rear end of the shoe is correspondingly suspended by links Q', which oscillate from the position shown in dotted lines to the position shown in full lines. This oscillation of the shoe causes a continuous lifting and tossing motion, which acts to carry the grain and material upon the shoe constantly toward the rear end.

Beneath the outer screens L' is a receiving-board R, which is suspended by side boards from the rear end of the shoe, and this board declines toward the outer end, so that the tossing movement of the shoe carries any grain or material which may fall through the screens above it toward the outer end and into a conveyer-box M', from which it is delivered by the usual screw into a return-elevator, and any heads or material needing re-threshing is returned to the threshing-cylinder in the usual manner. (Not here shown.) By this construction the main portion of the clean grain which passes through the screens L is returned to the conveyer-box M, while the material which has passed as far as the screens L' will be carried in the opposite direction by reason of the declination of the floor R toward the rear, thus keeping up the rearward movement of the material instead of reversing it and bringing it back to a conveyer nearer the front of the shoe. The blast of air which passes from the fan N through the screens L lifts the grain and chaff and carries it well toward the rear. Any part that is carried beyond these screens falls upon the sheet-iron bottom O, which forms the cover for the fan P, and the continual tossing motion of the shoe carries it over upon the screens L', which also receive the grain and chaff that is carried by the blast beyond the bottom O. This prevents much loss caused by blowing over beyond the rear end of the shoe. The additional blast from P continues the rearward movement of the chaff, and the worthless material is eventually discharged outwardly over the rear end of the shoe and the fingers S. This lengthening of the cleaning-shoe and the duplication of the screens and fans in a single structure is of great value to the class of traveling harvesters, because it enables them to more thoroughly clean and separate the grain and to prevent the great loss and waste which ordinarily takes place under the conditions above referred to.

Having thus described my invention, what I claim as new, and desire to secure by Letters Patent, is—

1. An improved grain separator and cleaner, consisting of an endless traveling open-slat belt, drums over which the upper part of the belt passes in a plurality of inclined sections, the intermediate portions forming approximately vertical connections between the upper end of each inclined portion and the lower portion of the following one, pickers positioned above the inclined sections of the belt and rotatable in opposite directions, and adapted to separate and loosen up the straw and forcibly deliver the same upon said inclined sections, a blast apparatus discharging through the belt, an inclined floor beneath each inclined section of belt, to prevent the said straw from passing through and becoming entangled with the belt, and an inclined return-board extending beneath the entire lower portion of the belt, a longitudinally-oscillating shoe into which the grain is delivered and including separate screens at each end of the shoe and an intermediate close floor or surface, oppositely-inclined return-boards beneath the ends of the shoe, separate conveyers to receive the grain from said boards, and a blast apparatus for each screen.

2. In a grain separator and cleaner of the character described the longitudinally-oscillating shoe, upwardly-extending rocker-arms supporting the receiving end and downwardly-extending arms suspending the outer end, whereby a tossing motion of the ends in opposite directions is produced, a plurality of screens in the same plane occupying opposite ends of the shoe with an intervening imperforate surface, a fan discharging through the outer screen from below, and a second fan, having its case formed of two segments, the lower of which discharges through the first screen and the upper discharges in a line parallel with and above the surface of the screens.

3. In a separator and cleaner, a longitudinally-oscillating shoe into which the grain is delivered from the separator, a set of screens fixed at the receiving end of the shoe, a blast apparatus delivering air through and above the screens as shown, a forwardly-inclined return-board and conveyer beneath said screens to receive the clean grain, a second set of screens fixed in the same shoe at the outer end, an interposed close floor or surface between the two sets of screens, a supplemental fan situated beneath said floor and discharging air independently through the rear screens a rearwardly-inclined table beneath said screens to receive any grain passing through them and a conveyer at the rear end into which said incline discharges.

In witness whereof I have hereunto set my hand.

DANIEL BEST.

Witnesses:
BARTON W. PERRY,
O. J. LYNCH.